Oct. 21, 1952 S. A. URSHAN 2,614,328
PIE AND CAKE DIVISION INDICATOR
Filed April 17, 1950

INVENTOR
SAMUEL A. URSHAN
BY
Wm H Dean
AGENT

Patented Oct. 21, 1952

2,614,328

UNITED STATES PATENT OFFICE 2,614,328

PIE AND CAKE DIVISION INDICATOR

Samuel A. Urshan, San Diego, Calif.

Application April 17, 1950, Serial No. 156,434

4 Claims. (Cl. 33—75)

My invention relates to a pie and cake division indicator, and the objects of my invention are:

First, to provide a simple pie and cake division indicator which will accurately indicate the division of a pie or cake into equal sections;

Second, to provide a pie and cake division indicator of this class which may be used to divide pies and cakes into a variety of numerical divisions, from two pieces to a considerably greater number of equal pieces, as desired;

Third, to provide an indicator of this class which may be readily and quickly placed in the center of a pie or cake for laying out the locations in which a knife or other instrument may be used to cut and divide the pie or cake in equal pieces;

Fourth, to provide a pie and cake division indicator of this class in which a pair of superimposed plates are provided with indexing portions which coincide with each other in accordance with a numerical scale for indicating the radial disposition of piece divisions from the center of the plate;

Fifth, to provide a division indicator of this class which is very simple to adjust and use;

Sixth, to provide a division indicator of this class which may be entirely supported in connection with a pie or cake for dividing the same; and Seventh, to provide a division indicator of this class which is very simple and economical of construction, efficient in operation, and which will not readily deteriorate or get out of order.

Figure 1:
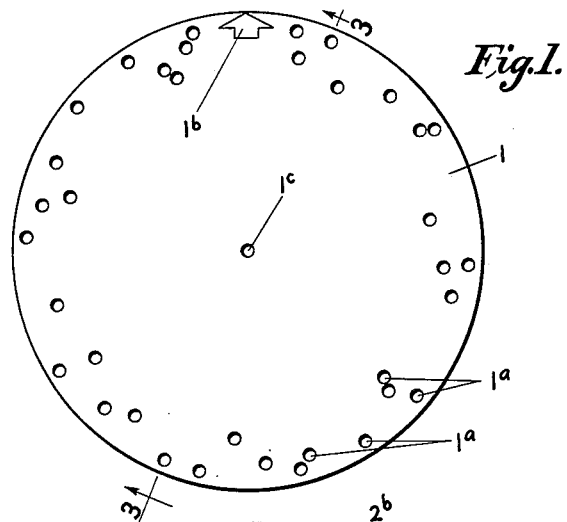
Figure 2:
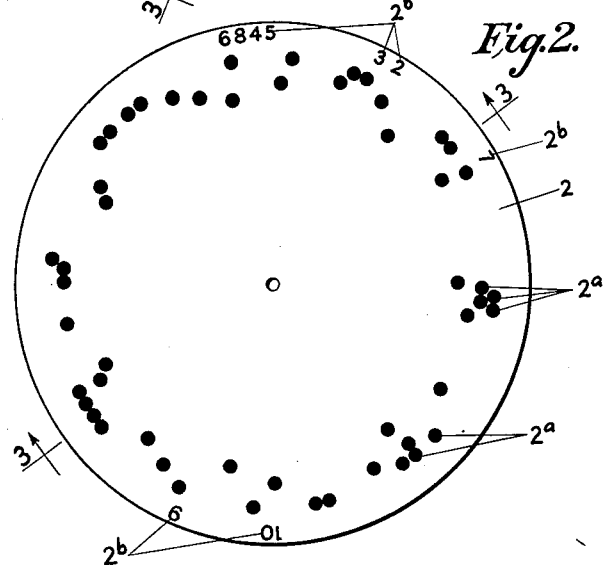
Figure 3:
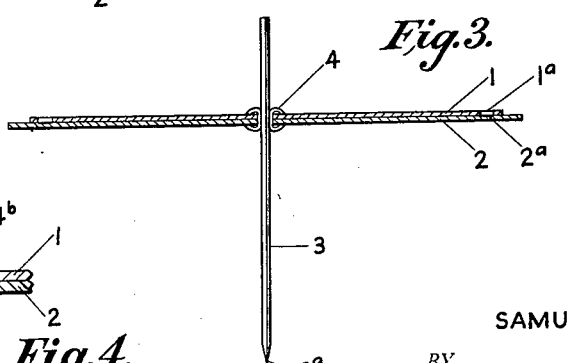
Figure 4:
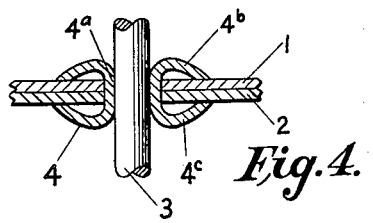

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application in which:

Fig. 1 is a top or plan view of the upper indexing plate of my pie and cake division indicator; Fig. 2 is a top or plan view of the lowermost indexing plate of my pie and cake division indicator; Fig. 3 is a sectional view of my pie and cake division indicator, showing the structure thereof in assembly, and taken from the lines 3—3 of Fig. 1 and Fig. 2; and Fig. 4 is an enlarged sectional view, taken on the same plane as that shown in Fig. 3, illustrating the structure fragmentarily.

Similar characters of reference refer to similar parts and portions throughout the several views of the drawings.

The plates 1 and 2, shaft 3, and bushing 4, constitute the principal parts and portions of my pie and cake division indicator.

The uppermost plate 1 is provided with a plurality of indexing portions 1a, which are preferably holes extending through the plate 1. Near the periphery of this plate 1 is provided an indexing pointer 1b, and in the center of the plate 1 is an opening 1c, in which the bushing 4 is positioned for retaining the shaft 3, as shown best in Figs. 3 and 4 of the drawings.

This bushing 4 is provided with a straight hollow cylindrical portion 4a at its middle, and is provided with disc-shaped flange portions 4b and 4c, which engage the plates 1 and 2, holding them in superimposed relationship to each other, as shown best in Fig. 4 of the drawings. The plate 2, shown in Fig. 2 of the drawings, is provided with indexing portions 2a, which may be viewed through the indexing openings 1a of the plate 1, and these indexing portions 2a are arranged in a certain fixed pattern and adapted to coincide with certain of the index openings 1a when the index pointer 1b is directed toward one of the division indicating numbers 2b on the plate 2, near the periphery thereof.

It will be here noted that the indexing portions 2a on the plate 2 may be either colored dots or openings, as desired.

The shaft 3 is frictionally engaged in the hollow cylindrical portion 4a of the bushing 4, and provides a support for the division indicator when used in dividing pies or cakes, or other objects.

The operation of my pie and cake division indicator is substantially as follows:

When it is desired to divide a pie, cake, or other article, into equal individual pieces, the operator first determines the number of pieces into which he wishes to divide the pie or cake, then he sets the indicator 1b of the plate 1 on the particular numerical designation 2b, and a corresponding number of openings or indexing portions 1a, will index with the same number of indexing portions 2a on the plate 2. For example, let us assume that the operator sets the pointer 1b on the numerical designation 2b, which is the number "6." Said setting is accomplished by rotating the plate 1 until the pointer 1b indexes with the numeral 6 of the designation 2b, which will expose six of the division index portions 2a through six of the division index portions 1a in the plate 1.

In placing the division indicator in connection with a pie or cake, the shaft 3, at its normally lower pointed end 3a, is placed in the middle of the pie or cake, and marks upon the upper surface of the pie or cake are made with the knife, corresponding to the location of the index openings 1a and index portions 2a of the plates 1 and 2, coinciding with each other. Thus, the division indicator is entirely supported on the object which is being divided during the layout of the division locations at which the cuts are to be made.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a division indicator, a pair of superimposed plates concentric with each other and rotatable relative to each other, one of said plates having a pattern of individual openings therein, said openings disposed and arranged to indicate the equal division of the perimeter of said plates in any one of several fractional proportions of three hundred sixty degrees, providing indexing portions, the other of said plates having indexing portions adapted to coincide with the openings in said first-mentioned plate, said first-mentioned plate having an index pointer, said second-mentioned plate having numerical division indication designations thereon, adapted to be indexed with said pointer, a central bearing for said plates for holding them in concentric rotatable relationship to each other.

2. In a division indicator, a pair of superimposed plates concentric with each other and rotatable relative to each other, one of said plates having a pattern of individual openings therein, said openings disposed and arranged to indicate the equal division of the perimeter of said plates in any one of several fractional proportions of three hundred sixty degrees, providing indexing portions, the other of said plates having indexing portions adapted to coincide with the openings in said first-mentioned plate, said first-mentioned plate having an index pointer, said second-mentioned plate having numerical division indication designations thereon, adapted to be indexed with said pointer, a central bearing for said plates for holding them in concentric rotatable relationship to each other, a shaft extending through said central bearing, providing a support for said plates during division layout operation therewith.

3. In a division indicator, a pair of round plates of different diameter, a central bearing member for both of said plates having flanges securing said plates together on the same axes and allowing relative rotation thereof, a shaft extending through said bearing providing a support for said plates, one of said plates having indexing portions intermediate the perimeter and the bearing indicating several possible equal sectoral divisions of a circle and said one of said plates having several numerical indications at the perimeter thereof, the other of said plates having apertures intermediate the perimeter and the bearing and a pointer at the perimeter whereby the pointer may be set at one of said numerical indications and thus causing certain of the apertures to coincide with and overlie certain of the indexing portions in said plates disclosing spaced points about a circle for dividing the circle in equal portions.

4. In a division indicator, a pair of round plates of different diameter having a central bearing member securing said plates together on the same axes and allowing relative rotation thereof, one of said plates having an indexing arrow and spaced apertures indicating equal sectoral divisions of a circle, the other of said plates having numerical indications and spaced indexing portions indicating equal radial divisions of a circle at relatively different locations than said apertures, whereby locating said arrow at one of said numerical indications provides for certain apertures to overlie and coincide with certain indexing portions indicating equal segments of a circle.

SAMUEL A. URSHAN.

REFERENCES CITED

The following references are of record in the file of this patent:

UNITED STATES PATENTS

| Number | Name | Date |
|---|---|---|
| 902,645 | Campana | Nov. 3, 1908 |
| 1,629,164 | Hughes | May 17, 1927 |
| 1,849,379 | Passek | Mar. 15, 1932 |
| 2,098,580 | Harding | Nov. 9, 1937 |
| 2,098,933 | Hathaway | Nov. 9, 1937 |
| 2,434,566 | Hulsmann | Jan. 13, 1948 |